Figure 1:
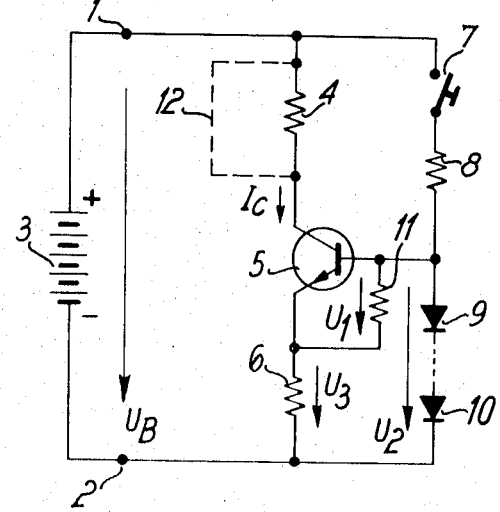

United States Patent

[11] 3,568,043

| [72] | Inventor | Friedrich Rabus<br>Stuttgart-Bad, Cannstatt, Germany |
|---|---|---|
| [21] | Appl. No. | 814,907 |
| [22] | Filed | Apr. 10, 1969 |
| [45] | Patented | Mar. 2, 1971 |
| [73] | Assignee | Robert Bosch G.m.b.H.<br>Stuttgart, Germany |
| [32] | Priority | Apr. 19, 1968 |
| [33] |  | Germany |
| [31] |  | 1,763,195.7 |

[54] DIODE CONSTANT VOLTAGE SOURCE LIMITS CURRENT THROUGH A SERIES TRANSISTOR CIRCUIT
9 Claims, 2 Drawing Figs.

[52] U.S. Cl. .................................................. 323/9,
307/237, 317/33, 317/148.5, 323/39
[51] Int. Cl. ....................................................... G05f 1/58
[50] Field of Search ........................................... 323/39, 4,
9, 22 (T), (Termatrex Search)(16—22,4,9);
317/33 (VR), 148.5; 307/237

[56]  References Cited
UNITED STATES PATENTS
3,246,233  4/1966  Herz............................. 323/9X
FOREIGN PATENTS
245,048  5/1963  Australia...................... 323/9

Primary Examiner—J. D. Miller
Assistant Examiner—Gerald Goldberg
Attorney—Flynn & Frishauf ABSTRACT: To provide a self-protecting feature in case of malconnection or malfunction of the load, a transistor controlling an electromagnetic operating circuit has connected a sensing resistance in series with its emitter-collector path, a constant voltage source formed of diodes from the current source (battery) to the emitter, and a comparison resistance connected across the emitter-base terminals of the transistor, the relative values of the sensing resistance, the comparison resistance and the voltage of the constant voltage source being so selected relative to each other that under ordinary operating conditions the emitter-base potential is sufficient to provide full conduction of the transistor, whereas, upon decrease of total resistance of the emitter-collector circuit, the transistor is controlled to assume a high resistance value and limit the flow of current therethrough to a safe value.

DIODE CONSTANT VOLTAGE SOURCE LIMITS CURRENT THROUGH A SERIES TRANSISTOR CIRCUIT

The present invention relates to the electrical system of automotive vehicles, and more particularly to the protection of semiconductor elements used in automotive electrical networks. Specifically, the present invention provides a self-protecting fail-safe circuit to be used in connection with fuel injection systems for internal combustion engines, in which the fuel injection valves are electromagnetically controlled.

Automotive vehicles of current constructions utilize many electrical connections, and it is difficult, and sometimes impossible to completely avoid erroneous interconnections. In some vehicles, which use electromagnetically controlled fuel injection, and in which the circuit through the electromagnetic element itself is controlled by a semiconductor, such as a power transistor, it is possible that the main current path, that is the emitter-collector path of the power transistor is connected directly across the vehicle battery if, for example, a cable or connecting element is connected to the transistor, rather than the load for which it was designed. Immediate destruction of the transistors due to overload will result.

Overcurrent through the emitter-collector path of a transistor can be limited by inserting in series therewith a resistance which limits the current through the emitter-collector path in case of short circuit across a battery. Due to the very low resistance of a fully conductive transistor, however, almost the entire battery voltage will then be across the current limiting resistance which, therefore, must be of sufficient size to dissipate heat due to the current therethrough. Additionally, a resistance sufficiently high to limit the current to a safe value decreases the power available from the emitter-collector circuit of the transistor, due to the voltage drop across such a limiting resistance under normal operating condition.

It has previously been proposed, in connection with voltage and current regulating circuits, to so control a transistor in series with a load circuit that it becomes nonconductive or, in effect, becomes blocked in case the load current exceeds a certain predetermined value. Such circuits, while entirely effective, require a substantial number of electrical components, however.

It is an object of the present invention to provide an electrical circuit arrangement particularly for use with internal combustion engines of the automotive type in which transistors are protected due to overload occurring as the result of misconnection of associated circuitry, or other defects, and which does not require a complicated circuit, or a large number of electronic components.

Briefly, the emitter-collector path, connected in series with an electromagnetic operating circuit, has a sensing resistance connected in series therewith, the entire circuit being connected across a vehicle battery. A comparison resistance is connected across the base-emitter terminals of the transistor. A constant voltage source is provided, by forwardly conduction diodes. The values of the resistances with respect to the voltage obtained from the diodes is so selected that, under normal conduction of the transistor, the emitter-base potential will be sufficient to provide for full "on" condition of the transistor; upon decrease of the total resistance of the electromagnetic operating circuit (that is, the load, the emitter-collector path and the sensing resistance), for example due to short circuit in the load, the emitter-base potential will change to be of sufficient value to control the transistor to have a higher resistance, and selected so that the resistance of the transistor will be sufficient that the current therethrough will be limited to a safe level. Thus, the sensing resistance need not dissipate short circuits and be of sufficient value only to provide a sensing potential.

In accordance with a feature of the present invention, the constant voltage delivered by the diodes provides the control potential for the semiconductor element; the constant voltage source can be connected in parallel to the series connection of the control circuit of the transistor and the sensing resistance. Current through the transistor can be limited to a desired value using a minimum number of components.

Figure 2:
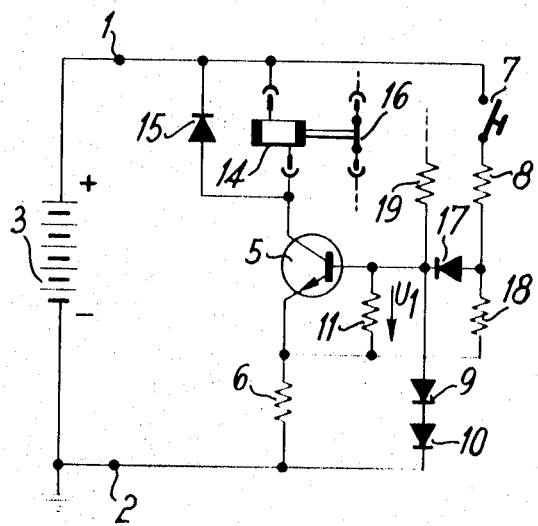

The invention will be described by way of example with reference to the accompanying drawings, wherein:

FIG. 1 is a schematic circuit illustrating the basis of the present invention; and FIG. 2 is a schematic circuit diagram illustrating an actual self-protected control circuit in connection with a fuel injection system.

Positive terminal 1 and negative terminal 2 are connected across a battery 3, providing a voltage $U_B$ to a network, which includes, in series, a load 4, the current path of a transistor 5, that is from the collector to the emitter and a sensing resistance 6. Conduction through transistor 5 which, as shown, is of the NPN type is controlled by a switch 7 which is shown in the example, to be a mechanically, momentarily operated switch although of course, it may be a different device and, itself be a semiconductor element. Switch 7, in series with a resistance 8, is connected from terminal 1 of battery 3 to the base of transistor 5. A group of diodes 9, 10 is connected between the base of transistor 5 and the negative terminal 2 of the battery. Diodes 9, 10 are connected in their conductive direction and serve as a constant voltage source. A base-emitter resistance 11, which may be termed a comparison resistance, is connected between the base of transistor 5 and the junction of the emitter of transistor 5 and sensing resistance 6. The broken line 12 indicates a possible misconnection, that is a direct short circuit across load 4.

If switch 7 is closed, current will flow over resistance 8 from terminal 1 and through the diodes 9, 10 to terminal 2. Additionally, current will flow over resistance 8 to the base of transistor 5, causing transistor 5 to become conductive. The value of resistance 11 is chosen to be high, and is so selected that the current through resistance 11 can be neglected. Transistor 5, if conductive, permits flow of current $I_c$ from terminal 1 over load 4, the collector-emitter path of the transistor 5 and the sensing resistance 6. The value of the sensing resistance is chosen to be low, so that in normal operation of the voltage $U_3$ is small with respect to the voltage $U_2$ supplied by the constant voltage source formed of diodes 9, 10. Thus, transistor 5 will remain in conductive condition. If switch 7 is opened, current through load 4 is disconnected, since resistance 11 will, in effect, place the base at the same voltage as the emitter, causing transistor 5 to block.

If, due to error or malfunction, load 4 is short-circuited as indicated by broken line 12, the transistor would rapidly burn out due to overload, that is due to its effective direct connection across battery terminals 1, 2. The self-protective circuit will then operate as follows to limit current $I_c$: If switch 7 is closed, constant voltage source 9, 10 will supply a voltage $U_2$ of fixed value to the circuit formed of the base-emitter path of transistor 5, in series with resistance 6. As noted before, the current through resistance 11 can be neglected. The voltage $U_1$ is limited to a substantially constant value, since the base-emitter path of the transistor acts, in effect, similar to a diode connected in conductive direction. For silicon transistors, this value is approximately 0.8 v. The voltage $U_3$ across the sensing resistance 6 will be equal to the difference of the voltage $U_2$ and the control voltage $U_1$, or, mathematically, $$U_2 = U_1 + U_3 \quad - (1)$$

If, for example, current $I_c$, and with it current through the resistance 6 is excessively high due to short circuit of load 4 (connection of broken line 12) then this current will initially cause an increase of the voltage $U_3$. This causes a drop in the voltage $U_1$, since, as $U_3$ increases, $U_1$ must decrease to satisfy the relation of formulate (1). This causes the control current in the emitter-base path of the transistor to decrease, causing a decrease in conduction of the transistor 5. This decrease in conduction will continue until equilibrium is obtained between the control current and current $I_c$ in view of the current amplification factor of the transistor. Sensing resistance 6 is so dimensioned that, in case of direct short circuit, the current through transistor 5 will not rise to a level which will cause destruction of the transistors and the sensing resistance 6.

FIG. 2 illustrates an arrangement in which the self-protecting circuit is part of an electronic fuel injection arrangement for automotive vehicles. Parts which are similar to those of FIG. 1, and which have already been described, will be given the same reference numerals and will not be described again.

Load 4 of FIG. 1 is replaced by a relay 14 to which a freewheeling quenching diode is connected in parallel. Relay coil 14 is mechanically coupled to a switch element 16 which is used in an electronic fuel ignition system, not further shown or described, or which can be utilized to control any other electrical circuit. Switch 7 is interconnected with the starting switch of the vehicle. During starting time, it is possible that negative voltage peaks may be applied to the transistor 5 over switch 7 and cause damage thereto. Therefore, a diode 17, and, if desired, an additional resistance 18 are provided, connected as shown in FIG. 2. The diode is so poled that it blocks possible negative voltage peaks. Resistance 18 acts as a voltage divider resistance. The conduction of transistor 5 may be controlled additionally over another circuit connected to a resistance 19.

Resistance 6 is so dimensioned that in operation the coil 14 will cause the relay to positively operate upon conduction of transistor 5, but still provides a voltage drop in case of short circuit across relay 14 which can be used as a sensing voltage to prevent current $I_c$ through the transistor to exceed a safe value. The number of diodes 9, 10 of the constant voltage source is chosen that a control voltage $U_1$ of about 0.8 is ensured in normal operating conditions and that the voltage across resistance 6 will still be sufficient to provide for positive operation of the circuit. Let it be assumed that due to misconnection of a plug an socket, the terminals of relay 14 and of the switch 16 which, as shown, is normally closed, are interchanged. The motor of the vehicle could not be started; the transistor will then, however, be connected across the battery 3 without a load. The circuit in accordance with the present invention will then control the transistor 5 to assume such a resistance that the current therethrough is limited to a safe value.

The circuit of the present invention provides a particularly simple an reliable arrangement to protect a semiconductor element from excessive current due to short circuits in its load network. This circuit is particularly useful in automotive vehicles. No special cooling arrangements are necessary for the transistor 5, although normal dissipating elements, capable of dissipating ordinary operating losses are preferably provided, in order to increase the thermal load which can be placed on transistor 5. The present circuit is thus particularly applicable to protect transistors which operate electromagnetic relays and which are so arranged that the coil terminals and switch terminals of the relays are subject to misconnection.

I claim:

1. A self- protecting automotive transistorized electromagnetic operating circuit controlled by a power transistor (5) and adapted for connection to a vehicle battery (3), said electromagnetic operating circuit including an electromagnetic operating device (4, 14) of predetermined resistance and the emitter-collector path of the power transistor (5) connected in series with said electromagnetic operating device, said series connected circuit being connected across the vehicle battery (3) comprising:

a sensing resistance (6) connected between the emitter of said power transistor (5) and one pole (2) of the vehicle battery (3);

a diode means (9, 10) having one terminal connected in forwardly conductive direction to said one pole (2) of the battery (3);

a resistance means (8, 19) connected at one end to the other pole of the battery (3) and at the other end to the emitter of said power transistor and to the other terminal of said diode means (9, 10) to supply current through said diode means whereby said diode means will function as a constant voltage source; and a comparison resistance (11) connected across the emitter-base terminals of the power transistor (5), and to the other terminal of said diode, the voltage values sensed by said sensing resistance (6) and said resistance (11), and the value of the constant voltage arising across said diode (9,10) being selected relative to each other to provide an emitter-base potential across said power transistor (5) sufficient for full conduction of said transistor upon normal current flow through its emitter-collector path and through the sensing resistance (6) and, upon decrease of the total resistance of said electromagnetic operating circuit from said predetermined value, causing normal current flow by providing an emitter-base potential of sufficient value to control the transistor to assume a higher resistance and permit flow of current of a safe level only.

2. Self-protecting, automotive circuit according to claim 1 wherein the electromagnetic operating device is a relay (14) having its coil connected in series with the emitter-collector path of the power transistor (5).

3. Self-protecting automotive circuit according to claim 1 wherein a plurality of diodes (9, 10) are provided, connected in series, the number of diodes and the value of said resistance means (8, 19) being selected to provide a constant voltage ($U_2$) across said diodes which is equal to the voltage drop ($U_1$) across the diode path formed by the base-emitter half of the power transistor (5) and the voltage drop ($U_3$) across the sensing resistance (6) under normal current flow.

4. Self-protecting overcurrent circuit for power transistors in which the emitter-collector circuit of the power transistor (5) is adapted for connection, in series, with an electric source (3) and a load, (4, 14) comprising:

a measuring resistance (6) connected in series with the emitter-collector circuit of the power transistor (5) and developing a sensing voltage ($U_3$) thereacross;

diode means (9, 10) connected in forward conductive direction across said source and deriving a fixed voltage ($U_2$); and means connecting said diode means to the base of said power transistor (5) to provide a pair of parallel paths having said fixed voltage ($U_2$) across the diode path and the sum of said sensing voltage $U_3$ and the emitter-base voltage ($U_1$) of said power transistor (5) across the other path said emitter-base voltage ($O_1$) decreasing with increasing sensing voltage ($U_3$) to control the transistor in a direction of decreasing conduction upon increase of current through said measuring resistance (6).

5. Circuit according to claim 4 wherein said means deriving a fixed voltage comprises a plurality of diodes (9, 10) connected in series, and said series connected diodes being connected across said measuring resistance (6) and the emitter-base circuit of said transistor (5), whereby, upon increasing current through the measuring resistance, the voltage across said emitter-base path of transistor (5) will drop to increase the resistance of the power transistor (5).

6. Circuit according to claim 4, including a comparative resistance (11) connected directly across the emitter-base terminals of the power transistor (5).

7. Circuit according to claim 4 wherein said load comprises a relay (14) having its coil connected in series with the emitter-collector path of the transistor (5).

8. Circuit according to claim 4 including a resistance means (8, 19) connected at one end of a pole (1) of the source (3) and at the other end to the base of said power transistor and thus forming said connecting means to said diode means to supply current through said diode means, whereby said diode means will function as a fixed voltage source supplying said fixed voltage ($U_2$).

9. Circuit according to claim 8 wherein said diode means comprises a plurality of series connected diodes, all connected in forward-conductive direction.